United States Patent [19]

Willdorf

[11] 4,028,475
[45] June 7, 1977

[54] SECURITY FILM FOR SHATTERPROOFING WINDOWS

[75] Inventor: Michael E. Willdorf, Malden, Mass.

[73] Assignee: Material Distributors Corporation, Woburn, Mass.

[22] Filed: May 21, 1975

[21] Appl. No.: 579,388

[52] U.S. Cl. .................................. 428/215; 428/40; 428/214; 428/343; 428/352; 428/354; 428/355; 428/441; 428/442; 428/458; 428/480; 428/483; 428/910

[51] Int. Cl.² ................ B32B 17/08; B60J 1/06; B60J 3/00; B32B 15/08

[58] Field of Search .......... 428/214, 215, 354, 343, 428/40, 910, 458, 355, 441, 442, 480, 336, 335, 337, 352, 483, 911

[56] References Cited

UNITED STATES PATENTS

| | | | |
|---|---|---|---|
| 2,653,885 | 9/1953 | Harper | 428/354 |
| 3,100,760 | 8/1963 | Brown | 428/483 |
| 3,170,833 | 2/1965 | Noyes | 428/416 |
| 3,290,203 | 12/1966 | Antonson | 428/483 |
| 3,307,963 | 3/1967 | Webber | 428/354 |
| 3,681,179 | 8/1972 | Theissen | 428/336 |
| 3,775,226 | 11/1973 | Windorf | 428/354 |
| 3,949,134 | 4/1976 | Willdorf | 428/458 |
| 3,956,559 | 5/1976 | Willdorf | 428/483 |
| R28,883 | 6/1976 | Willdorf | 428/458 |

Primary Examiner—Ellis Robinson
Attorney, Agent, or Firm—Morse, Altman, Oates & Bello

[57] ABSTRACT

A security film for shatterproofing windows comprises: at least two oriented polyethylene terephthalate self supporting strata having critical thicknesses for shock absorption and tensile strength, of which at least one optionally has a semi-transparent vapor deposited aluminum coat for solar control; and at least two relatively soft bonding strata having critical thicknesses for adhesion and cohesion, of which at least one is an internal copolyester stratum for bonding self supporting strata together and one is a pressure sensitive stratum at the outer surface of the film for application to window glass.

2 Claims, 5 Drawing Figures

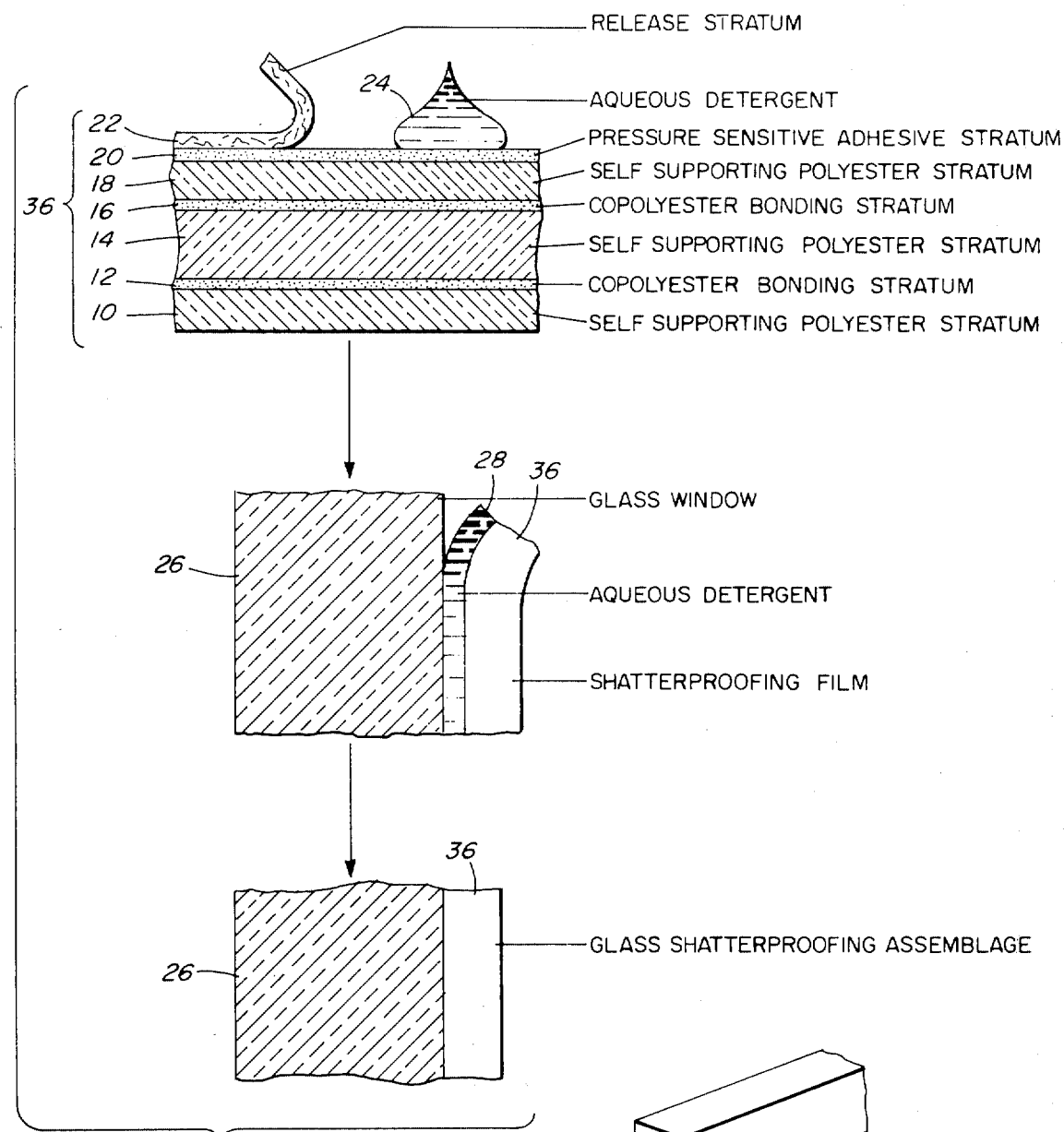
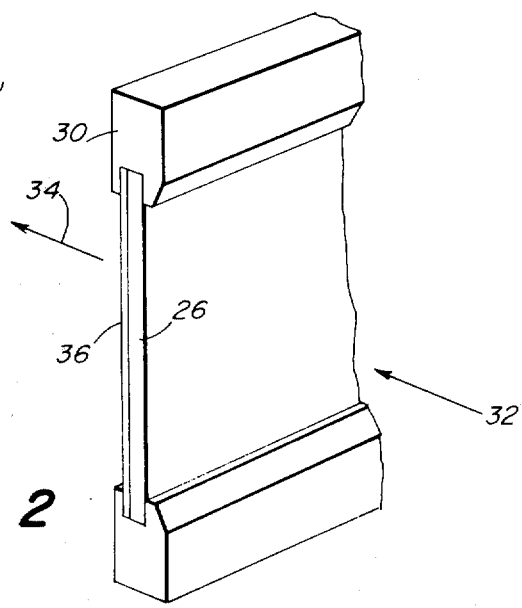
FIG. 1
FIG. 2

4,028,475

SECURITY FILM FOR SHATTERPROOFING WINDOWS

BACKGROUND AND SUMMARY

The present invention relates to a security film for shatterproofing windows against impact or explosion without normally detracting from their optical clarity, and, more particularly, to a security film for ready application to the inner face of a window as a safeguard against fragmentation of glass notwithstanding its splintering or cracking when damaged from outside. Prior optically clear security films, when adhered to window faces, have tended to rip in the event of impact or explosion to the accompaniment of flying glass, which is the primary danger that safety film is intended to prevent.

In accordance with the present invention, it has been found that 2½ to 6 mils (62.5 to 150 microns) thick laminated assemblage (not including any release stratum) of alternate polyethylene terephthalate strata and inner and outer bonding strata, provides for radically improved shatterproofing when applied to the inner face of an architectural window, if (1) each of at least two of the polyethylene terephthalate strata is at least 1 mil thick, (2) each of the inner bonding strata between the polyester terephthate strata is composed of from 3.2 to 9.6 grams per square meter of a copolyester bonding agent from 0.1 to 0.3 mil (2.5 to 7.5 microns) thick, and (3) the outer bonding stratum for adhering the assemblage to a glass window is composed of from 9.6 to 38.4 grams per square meter of a pressure-sensitive acrylate polyene from 0.4 to 1.5 mil (10 to 37.5 microns) thick. All of these strata are optically clear and water vapor permeable and, optionally one or more of the polyethylene terephthalate strata is coated with a vacuum vapor depositied semi-transparent aluminum stratum. Based on the overall thickness of the assemblage, the copolyester stratum ranges from 6 to 18 percent and the pressure-sensitive stratum ranges from 13 to 26 percent. While the basis for the shatterproofing efficacy of this assemblage is not understood with certainty, it is postulated that this assemblage possesses a critical balance of physical properties including: sufficient overall flexibility to permit high incremental pressure when squeegeed onto a glass window; sufficient tensile modulus, impact strength and tear strength imparted by the oriented polyster strata to preclude rupture while distributing shock; particular adhesion, cohesion, compatibility and resilience to withstand shock without failure; sufficient modulus of rigidity discontinuities between the polyester terephthalate strata and the inner bonding strata to damp vibratory energy transfer; and particular adhesion, cohesion, compatibility and resilience imparted by the pressure-sensitive bonding stratum to catch and retain glass chards that are produced by deformation of the security film-window combination at the moment of initial impact.

BRIEF DESCRIPTION OF DRAWINGS

For a fuller understanding of the nature and objects of the present invention, reference is made to the following detailed description, taken in connection with the accompanying drawing, wherein:

FIG. 1 is a flow diagram illustrating a security film, in exaggerated cross-section, undergoing a process of the present invention, and an assemblage resulting therefrom;

FIG. 2 illustrates a window incorporating the present invention;

DETAILED DESCRIPTION

Figure 3:
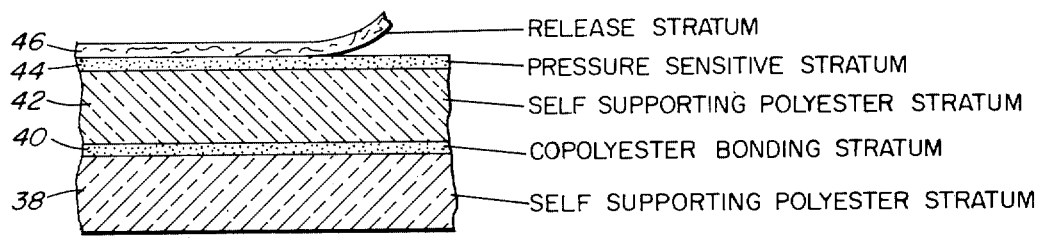
FIG. 3 is an alternative product, in exaggerated cross-section, analogous to the product of FIG. 1.

Generally, each of the security films ranges from 2½ to 6 mils (62.5 to 150 microns) in overall thickness and comprises from two to five self-supporting strata, inner bonding strata for laminating them together and an outer bonding stratum for laminating the security film to a glass window. Each of at least two of the self supporting strata are composed of biaxially oriented polyethylene terephthalate and range in thickness from 1 to 3 mils (25 to 75 microns). Each of the inner bonding strata is composed of a polyester terephthalate copolymer of low molecular weight relative to that of the self supporting strata, particularly a hydrocarbon or polyol copolymer of polyethylene terephthalate such as polyethylene glycol terephthalate, polyethylene propylene terephthalate and polyethylene butylene terephthalate, and ranges in thickness from 0.1 to 0.3 mil (2.5 to 7.5 microns). The pressure sensitive adhesive stratum is composed of an acrylic base resin and a polyene tackifier, and ranges in thickness from 4 to 15 times the thickness of one of the inner bonding strata, typically from 0.4 to 1.5 mil (10 to 37.5 microns). A typical formulation of the pressure sensitive stratum incorporates from 15 to 30 parts of a straight chain acrylate, particularly, a copolymer, homopolymer or interpolymer of methyl acrylate, ethyl acrylate, propyl acrylate or butyl acrylate, and from 2.5 to 7.5 parts of a low molecular weight rubber, particularly, a polyhydrocarbon such as polybutene or polyterpene. Optionally one of the polyethylene terephthalate strata is coated with a vacuum vapor deposited stratum of aluminum ranging in thickness to no more than 300 angstroms and characterized by a visible light transmission of from 5 to 60%.

Typically the pressure sensitive stratum is characterized, in accordance with the tests at 72° F (22° C) described below: by a rolling ball test value (PSTC Test No. 7) ranging from 1/16 to 6 inches (.15 to 15 centimeters); by a static sheer test value (PSTC Test No. 6) ranging between 1 and 5 hours; and by a 180 degree static peel test value (PSTC Test No. 1) ranging between 7.5 and 75 ounces (213 to 2130 grams). These tests, which refer to the Pressure Sensitive Tape Council (PSTC), are described in space of 2 inches.

In the static sheer test, a substrate is coated with the pressure sensitive adhesive to a dry thickness of approximately 1 mil (25 microns). A 1 inch (2.5 centimeter) square of the coated substrate is applied to a clean stainless steel plate and rolled twice with a 5 pound (2¼ kilograms) rubber roll. The plate is positioned in a jig. A weight is attached to the bottom of the substrate and the assembly is subjected to a selected temperature. The time to complete failure or the distance the substrate moves after a set time is recorded as the value.

In the 180° static peel test, the pressure sensitive adhesive is applied to and cured on a flexible substrate, which is reversely bent. One of the exposed pressure sensitive faces is pressed onto a vertical rigid substrate and the other is attached to a depending weight. The weight required to cause peeling is the test value.

In the rolling ball test, a 7/16 inch (0.9 centimeter) diameter stainless steel ball is rolled down an approximately 45 degree inclined plane onto the pressure sensitive surface. The distance from the bottom of the inclined plane to where the ball stops is measured in inches to provide the indicated value.

EXAMPLE I

The security film 36 of FIG. 1 comprises in laminated sequence: a polyethylene terphthalate stratum 10 that is 1 mil (25 microns) thick; a polyethylene glycol terephthalate stratum 12 that is 0.2 mil (5 microns) thick; a polyethylene terephthate stratum 14 that is 2 mils (50 microns) thick; a polyethylene glycol terephthalate stratum 16 that is 0.1 mil thick; a polyethylene terephthalate stratum 18 that is 1 mil (25 microns) thick; a methyl acrylate polybutene pressure sensitive stratum 20 that is 0.6 mil (15 microns) thick; and a silicone impregnated paper release stratum 22 that is 2 mils (50 microns) thick. All of these strata are interrelated chemically and mechanically and are optically clear as discussed above. In use, release stratum 22 is peeled from pressure sensitive stratum 20 and a lubricating coat of aqueous detergent 24 is applied to pressure sensitive stratum 20. Thereafter, the film is squeegeed onto the inner face of a glass window 26 with aqueous stratum 28 interposed between the window and the film. When allowed to dry by permeation of moisture through film 36 and from the free edges of glass window 26 and film 36, the resulting assemblage of glass window 26 and security film 36, when secured within a conventional architectural frame 30, has an extraordinary ability to withstand shock originating from direction 32 and to prevent glass chards from being projected in direction 34. In this example, the inner bonding strata more specifically are described in U.S. Pat. No. 3,170,833, issued on Feb. 23, 1965 in the name of Paul R. Noyes for Adhesive Compositions And Laminates Prepared Therefrom. In this example, the methyl acrylate polybutene pressure sensitive stratum has the following characteristics: a rolling ball test index of 4.5 inches (11.6 centimeters); a 180° peel test index of 12.5 ounces (3.5 kilograms); and a static sheer test index of 24 hours.

EXAMPLE II

Another security film of the present invention is shown in FIG. 3 as comprising: a first polyethylene terephthalate stratum 38 that is 2 mils (50 microns) thick; a polyethylene glycol terephthalate stratum 40 that is 0.2 mil (5 microns) thick; a polyethylene terephthalate stratum 42 that is 2 mils (50 microns) thick; a methyl acrylate polybutene pressure sensitive stratum 44 that is 0.8 mil (20 micron) thick; and a silicone impregnated paper release stratum 46 that is 2 mils (50 microns) thick. All of these strata are interrelated chemically and mechanically and are optically clear as discussed above. This security film is processed in the same manner as the security film of Example I.

EXAMPLE III

Figure 4:
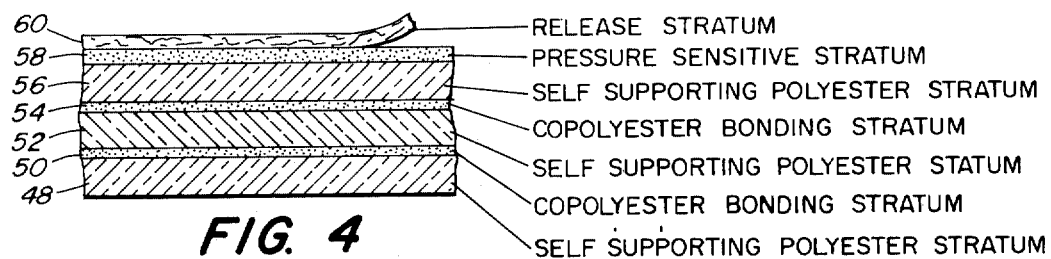
FIG. 4 is another alternative product, in exaggerated cross-section, embodying the present invention.

Another security film of the present invention is shown in FIG. 4 as comprising: three polyester terephthalate strata 48, 52, 56, each 1 mil (25 microns) thick; two interposed inner bonding strata 50, 54 which are composed of polyethylene glycol terephthalate and are 0.2 mil (5 microns) thick; a methyl acrylate polybutene pressure sensitive stratum 58 that is 1 mil (25 microns) thick; and a silicone impregnated paper release stratum 60 that is 1 mil (25 microns) thick. All of these strata are interrelated chemically and mechanically and are optically clear as discussed above. This security film if processed in the same manner as the security film of Example I.

EXAMPLE IV

Figure 5:
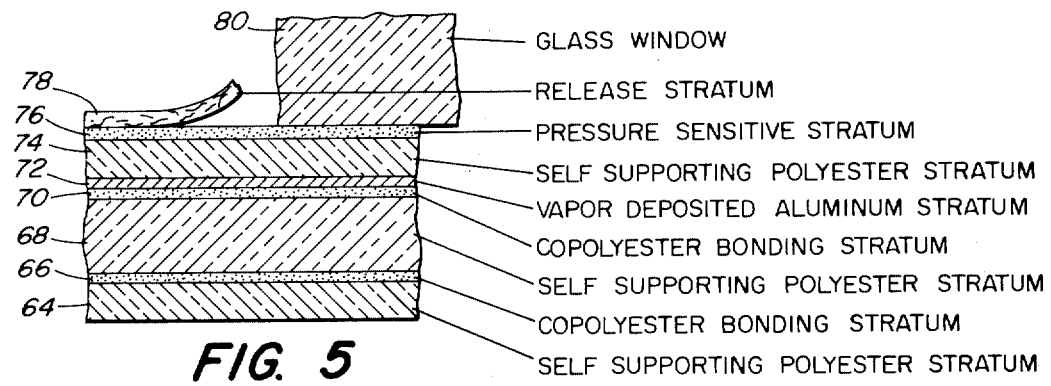
FIG. 5 is a further alternative product, in exaggerated cross-section, embodying the present invention.

Another film, which combines security and solar control functions, is shown in FIG. 5 as comprising: three polyester terephthalate strata 64, 68, 74, of which each of strata 64, 74 is 1 mil (25 microns) thick and stratum 68 is 2 mils (50 microns) thick; two interposed inner bonding strata 66, 70, which are composed of polyethylene glycol terephthalate and are 0.2 mil (5 microns) thick; a vapor deposited aluminum coat 72, on a surface of stratum 74, which is interposed between this surface and stratum 70 and is approximately 100 angstrom units thick; a methyl acrylate polybutene pressure sensitive stratum 76 that is 1 mil thick; and a silicone impregnated paper release stratum 78 that is 1 mil (25 microns) thick. All of these strata are interrelated chemically and mechanically and are optically clear as discussed above. This security and solar control film is processed in the same manner as the security film of Example I to produce a security and solar control composite assemblage incorporating an architectural window 80 in the manner shown in FIG. 2.

It is to be understood that the vapor deposited aluminum stratum of FIG. 5 may be applied optionally to any of the inner faces of the polyethylene terephthalate strata of the films of FIGS. 1, 2, 3 and 4. The present invention thus comprises the security films of FIGS. 1, 3, 4 and 5 and the security film and glass window assemblage of FIG. 2. Since certain changes may be made in the foregoing disclosure without departing from the scope of the invention herein involved, it is intended that all matter shown in the accompanying drawing or described in the foregoing specification be interpreted in an illustrative and not in a limiting sense.

What is claimed is:

1. A security film comprising as laminated components:
   a. from two to five self-supporting strata, each of said self-supporting strata ranging in thickness from 1 to 3 mils and being composed of biaxially oriented polyethylene terephthalate;
   b. a plurality of inner bonding strata laminating said self-supporting strata together, each of said inner bonding strata ranging in thickness from 0.1 to 0.3 mil and consisting essentially of a copolymer of polyethylene terephthalate;
   c. a pressure-sensitive adhesive stratum on one face of said self-supporting strata, said pressure sensitive adhesive stratum ranging in thickness from 4 to 15 times the thickness of one of said inner bonding strata and consisting essentially of 15 to 30 parts of an acrylic resin and from 2.5 to 7.5 parts of a polyene tackifier wherein said pressure-sensitive stratum is characterized by a 72° F rolling ball test value ranging from 1/16 to 6 inches, a 72° F static sheer value ranging between 1 and 5 hours, and by a 180° F static peel test value ranging between 7.5 and 75 ounces;

d. all of the strata of said security film being optically clear and the overall thickness of said security film ranging in thickness from 3 to 6 mils wherein the thickness of said inner bonding strata is from 6 to 18 percent of said overall thickness and the thickness of said pressure-sensitive adhesive stratum ranges from 13 to 26 percent of said overall thickness;

e. whereby said laminated components provide sufficient overall flexibility to permit high incremental pressure when squeegeed onto a glass window, sufficient tensile modulus, impact strength and tear strength imparted by said self-supporting strata to preclude rupture while distributing shock; particular adhesion, cohesion, compatibility and resilience to withstand shock without failure, characteristic modulus of rigidity at the discontinuities between said self-supporting strata and said inner bonding strata to damp vibratory energy transfer, and particular adhesion, cohesion, compatibility and resilience imparted by said pressure sensitive bonding stratum to catch and retain glass chards produced by deformation of a laminated combination of said security film and a glass window at the moment of an impact.

2. A security film comprising as laminated components:

a. from two to five self-supporting strata, each of said self-supporting strata ranging in thickness from 1 to 3 mils and being composed of biaxially oriented polyethylene terephthalate;

b. a plurality of inner bonding strata laminating said self-supporting strata together, each of said inner bonding strata ranging in thickness from 0.1 to 0.3 mil and consisting essentially of a copolymer of polyethylene terephthalate;

c. a pressure-sensitive adhesive stratum on one face of said self-supporting strata, said pressure-sensitive adhesive stratum ranging in thickness from 4 to 15 times the thickness of one of said inner bonding strata and consisting essentially of 15 to 30 parts of an acrylic resin and from 2.5 to 7.5 parts of a polyene tackifier wherein said pressure-sensitive stratum is characterized by a 72° F rolling ball test value ranging from 1/16 to 6 inches, a 72° F static sheer value ranging between 1 and 5 hours, and by a 180° F static peel test value ranging between 7.5 and 75 ounces;

d. a vapor deposited aluminum stratum on a face of one of said self-supporting strata interposed between said face and one of said inner bonding strata, said vapor deposited aluminum stratum being semi-transparent, said vapor deposited aluminum stratum ranging in thickness up to 300 angstroms and characterized by a light transmission of from 5 to 60%;

e. all of the strata of said security film being optically clear and the overall thickness of said security film ranging in thickness from 3 to b 6 mils wherein the thickness of said inner bonding strata is from 6 to 18 percent of said overall thickness and the thickness of said pressure-sensitive adhesive stratum ranges from 13 to 26 percent of said overall thickness;

f. whereby said laminated components provide sufficient overall flexibility to permit high incremental pressure when squeegeed onto a glass window, sufficient tensile modulus, impact strength and tear strength imparted by said self-supporting strata to preclude rupture while distributing shock; particular adhesion, cohesion, compatibility and resilience to withstand shock without failure, characteristic modulus of rigidity at the discontinuities between said self-supporting strata and said inner bonding strata to damp vibratory energy transfer, and particular adhesion, cohesion, compatibility and resilience imparted by said pressure sensitive bonding stratum to catch and retain glass chards produced by deformation of a laminated combination of said security film and a glass window at the moment of an impact.

* * * * *